United States Patent [19]

Hale

[11] Patent Number: 4,909,536
[45] Date of Patent: Mar. 20, 1990

[54] ELECTRONIC HEIGHT SENSOR

[75] Inventor: James A. Hale, Saline, Mich.

[73] Assignee: Monroe Auto Equipment, Monroe, Mich.

[21] Appl. No.: 261,685

[22] Filed: Oct. 24, 1988

[51] Int. Cl.$^4$ .............................................. B60G 11/28
[52] U.S. Cl. ...................................... 280/707; 180/41; 280/840
[58] Field of Search ......... 280/707, 840, 6.1, DIG. 1; 324/208; 180/41

[56] References Cited

U.S. PATENT DOCUMENTS

| | | | |
|---|---|---|---|
| 2,564,221 | 8/1951 | Hornfeck | 171/777 |
| 2,792,209 | 5/1957 | Allen | 265/40 |
| 3,827,291 | 8/1974 | McCalvey | 73/88.5 R |
| 4,017,099 | 4/1977 | Hegel et al. | 280/707 |
| 4,106,175 | 8/1978 | Meyer | 29/343.52 |
| 4,127,814 | 11/1978 | Rasigade et al. | 324/208 |
| 4,141,572 | 2/1979 | Sorensen | 280/707 |
| 4,471,304 | 9/1984 | Wolf | 324/208 |
| 4,502,006 | 2/1985 | Goodwin et al. | 324/208 |
| 4,623,840 | 11/1986 | Fujimura et al. | 324/208 |
| 4,726,453 | 2/1988 | Obstfelder et al. | 280/707 |
| 4,730,816 | 3/1988 | Eckert | 280/707 |
| 4,743,046 | 5/1988 | Schnittger | 280/707 |

FOREIGN PATENT DOCUMENTS

| | | |
|---|---|---|
| 2911768 | 10/1980 | Fed. Rep. of Germany . |
| 3227903 | 2/1984 | Fed. Rep. of Germany . |
| 637836 | 8/1988 | Greece . |
| 58-6401 | 1/1983 | Japan . |
| 58-193402 | 11/1983 | Japan . |
| 61-20337 | 6/1986 | Japan . |
| 2106651 | 4/1983 | United Kingdom . |
| 2163260 | 2/1986 | United Kingdom . |

*Primary Examiner*—Richard A. Bertsch
*Attorney, Agent, or Firm*—Harness, Dickey & Pierce

[57] ABSTRACT

A vehicle leveling strut of the type having a direct-acting hydraulic shock absorber provided with a reciprocable piston rod having a dirt shield mounted thereon. A tubular rolling diaphragm member secured at one end to the shock absorber and to the opposite end to the dirt shield and defining therewith a variable volume chamber adapted to be selectively pressurized and de-pressurized for controlling the distance between the sprung and unsprung portions of an associated vehicle. Located interiorly of the pressurizable chamber and concentrically positioned between the shock absorber and fixedly mounted to the dirt shield is a generally tubular support member upon which is mounted at least one pair of electrical coil windings for sensing changes in the electromagnetic field of each coil winding. Associated with the shock absorber axially moving through the tubular support member are means for changing the electromagnetic fields of the coil windings so as to provide a control signal which effects actuation of a pressurized fluid supply source.

32 Claims, 2 Drawing Sheets

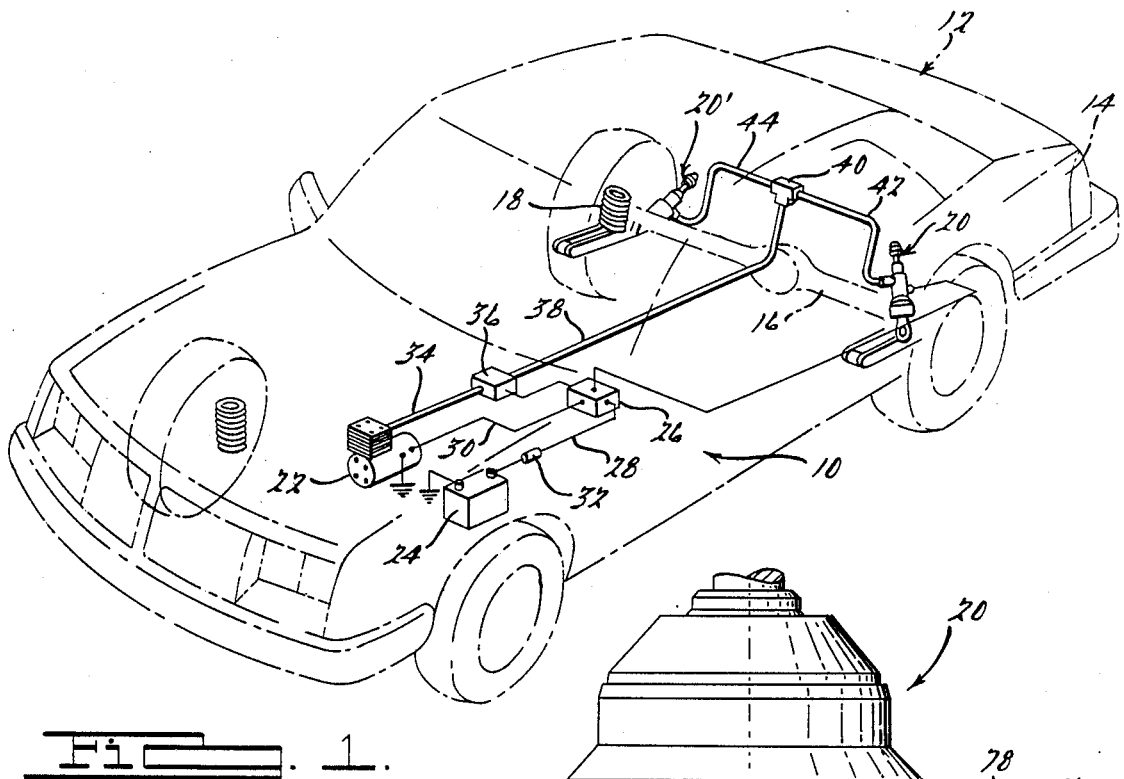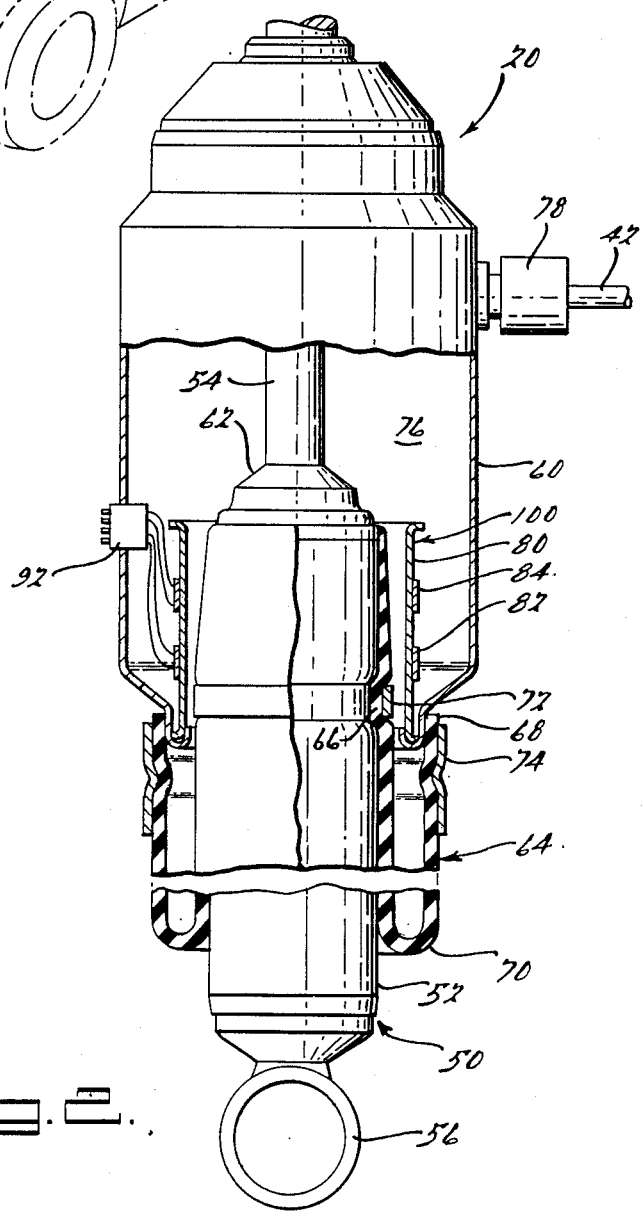

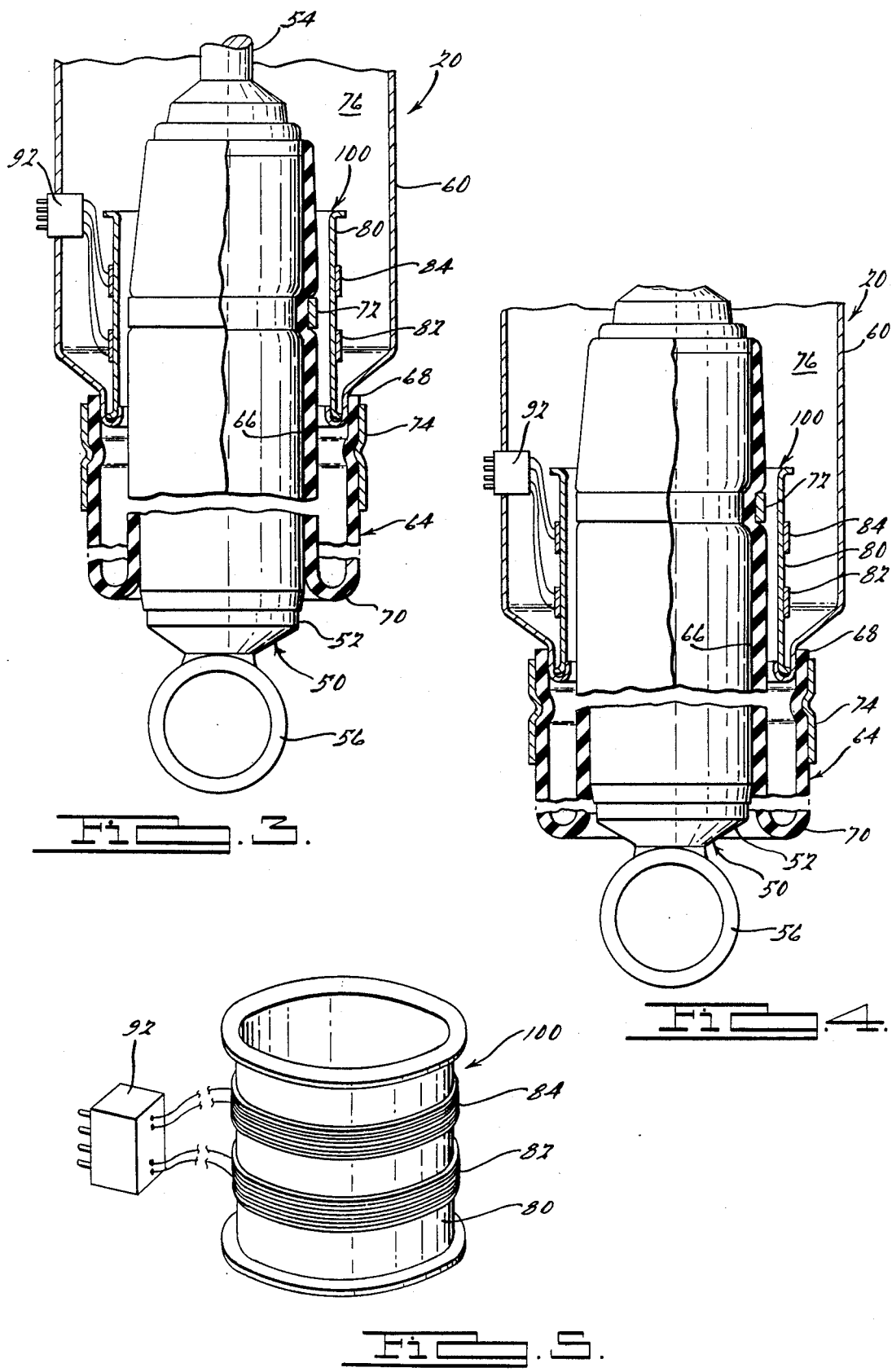

ELECTRONIC HEIGHT SENSOR

BACKGROUND OF THE INVENTION

1. Field of the Invention

This invention relates to vehicle leveling systems, and more particularly, to a new and improved vehicle leveling device incorporating a novel electronic height sensing apparatus.

2. Description of the Related Art

Vehicle leveling systems function to maintain a predetermined height relationship between a chassis (sprung portion) of a vehicle and its ground engaging axle assemblies (unsprung vehicle portion). Such systems utilize one or more auxiliary fluid suspension components to supplement the load carrying capacity of the primary vehicle springs. A pressure source is often included in such leveling systems for supplying pressurized fluid to the auxiliary suspension components when a load of predetermined magnitude has been added to the vehicle chassis. Upon such loading, the auxiliary suspension components become operable to supplement the load carrying capacity of the primary springs to return the vehicle chassis to a desired height relationship with respect to the ground engaging axle assembly. When the vehicle load is removed, the primary suspension springs and pressurized auxiliary suspension components co-act to cause the chassis to rise above the desired relationship. When this occurs, the leveling system causes the pressurized fluid to be exhausted from the auxiliary suspension components.

To accomplish the aforesaid pressurizing and exhausting of fluid from the auxiliary suspension components, it has been the practice to utilize some type of a height detecting controller. For example, U.S. Pat. No. 4,017,099 discloses an external height detecting controller located remote from vehicle leveling struts of vehicle leveling systems. Such height detecting controllers generally function to vary the attitude or trim height between the ground engaging axle of a vehicle and a vehicle's chassis. The height detecting controller senses sustained changes in the height relationship between the axle and chassis and controls fluid flow between a suitable source of a pressurized fluid and the suspension struts. Such remotely located controllers have been found to be objectionable because they often require separate factory installation. Additionally, such controllers require accurate positioning and calibration adjustment in order to assure the desired overall operation of the leveling system.

While integrated controllers and suspension struts have been proposed in the U.S. Pat. Nos. 3,584,894 and 3,606,375, such devices have been found to be objectionable due to the fact that they were located externally of the suspension struts and thus were subject to the hostile environment that exists in connection with modern automotive vehicles.

Aforementioned U.S. Pat. No. 4,017,099 discloses an arrangement by which the height controlling elements are located interiorly of the pressurizing chamber. U.S. Pat. No. 4,141,572 discloses a refinement of the principles set forth in the earlier mentioned patent by which the height sensing elements and their associated electronic circuitry may be conveniently mounted directly upon one peripheral wall portion of the pressurizing chamber of the associated leveling strut.

U.S. Pat. Nos. 4,017,099 and 4,141,572 and the present invention are preferably combined with an electrical connector arrangement. The connector is intended to be communicable via a suitable opening or aperture in the suspension strut dirt shield with suitable electrical conductors connected to the associated control system and pressurizing source. Additionally, because a portion of the associated electrical circuitry and height sensing means are supported within the pressurizing chamber, they are protected from the hostile exterior environment. However, aforementioned U.S. Pat. Nos. 4,017,099 and 4,141,572 disclose height sensing control mechanisms utilizing optical height sensing means including a light source and means sensitive to the light source for controlling pressurization of the vehicle leveling strut. Specifically, a pair of light sensitive devices are mounted substantially opposite from a light source upon the interior wall of the dirt shield, or to a support member secured thereto, and are operatively associated such that when the reciprocating shock absorber cylinder blocks the transmission of light from the light source to one or both of the light sensitive devices, an electrical signal is produced to actuate the source of fluid pressure so as to adjust the leveling strut height accordingly. Pre-assembly alignment of the light sensitive devices with the light source so as to direct sufficient light transmission is required.

Further methods for sensing the variable location of reciprocating components are disclosed in United Kingdom patent application No. GB 2 163 260 A, as well as U.S. Pat. Nos. 4,502,006 and 4,623,840. These patents disclose methods and apparatuses for sensing the real-time variable position of a reciprocating member. These references are adapted for variable displacement sensing rather than to discrete positional sensing to which the present invention is directed.

It is to be noted that the terms "height," "distance," "attitude," etc. and derivatives thereof are used interchangeably herein as well as throughout the automotive art, as referring to the magnitude of spacing between a vehicles sprung and unsprung portions (e.g., between a vehicle frame and its associated axles). It is also to be noted that the term "associated electronic circuitry" used herein is intended to mean wires, conductors (either discrete wires or printed circuits), as well as electronic components per se, either solid state or otherwise or any combinations thereof. Lastly, the vehicle leveling device described herein which incorporates the novel electronic height sensing apparatus encompasses application to either suspension "struts" or "shock absorbers" as utilized in vehicle leveling systems.

SUMMARY OF THE INVENTION

Accordingly, it is a primary object of the present invention to provide a vehicle leveling strut apparatus incorporating a new and improved height sensing device wherein the height sensing and controlling elements, as well as a portion of the electronic circuitry, are mounted directly within the suspension strut.

Another object of the present invention is to provide a new and improved height sensing device adaptable for application in typical leveling systems and which is of relatively simple design, is economical to manufacture, and will have a long and effective operational life.

A further object of the height sensing device is to produce a plurality of discrete electrical signals corresponding to the positional location of the shock absorber relative to the height sensing devices as positioned within the leveling strut assembly, wherein said discrete signals eliminate complex signal processor logic systems and calibration requirements necessitated by variable displacement sensing mechanisms.

Additionally, it is another object of the present invention to provide a method and apparatus for generating electrical output signals corresponding to a plurality of discrete positional inputs so as to interact with the associated control system and pressurizing source.

Specifically, the apparatus according to the present invention encompasses a simplified height sensing device as incorporated into an air adjustable leveling strut. The air adjustable leveling strut consists of a direct acting hydraulic shock absorber, a generally tubular dirt shield coaxially mounted over the piston rod of the shock absorber and a tubular rolling diaphragm member secured to the outer surface of the shock absorber and dirt shield so as to define a sealed pressurizable chamber. Clamping rings are used to secure the diaphragm to its respective surfaces. The height sensing device, consisting of a generally tubular support member, is secured to the inner peripheral surface of the dirt shield within the chamber and axially positioned so as to allow telescopically reciprocating motion of the shock absorber therethrough. Encircling the support member at two distinct positions are two electrical coil windings which are used to generate two electromagnetic fields, the changes in which are delivered to the vehicle's control module circuitry. An electrical connector is airtightly mounted in an opening through a wall portion of the dirt shield to provide the communicative path between the pair of coil windings and the vehicle control module. The chamber is operatively connected to an external pressurized fluid source actuated by the control circuitry to adjust the vehicular attitude in response to the positional signals generated by the coil windings.

According to the method of the present invention, each of the independent coil windings produces an electromagnetic field, the changes in which may be sensed by the control module circuitry of the vehicle. The windings define three discrete signals for sensing positional location of the shock absorber axially reciprocable through the support member on which the windings are maintained. These positions correspond to below, between, and above the longitudinally spaced coil windings. As the shock absorber cylinder moves axially in response to the magnitude of the load carried by the vehicle, the clamping ring securing the diaphragm to the shock absorber cylinder induces a change in the electromagnetic flux of the electromagnetic field associated with either of the first or second coil windings so as to sense one of the three aforementioned positions. This change in the electromagnetic fields signals the control circuit to actuate the fluid pressure source for introducing or exhausting air into the chamber, thereby returning the vehicle to the desired trim height relationship with respect to the ground engaging axle assembly.

Accordingly, the present invention senses relative position rather than variable position by utilizing electromagnetic principles. This height sensing device allows for longitudinal spacing of the coil windings at a predefined distance on the support member which corresponds to the specific vehicular application requirements. It is contemplated that a plurality of coil windings may be incorporated into this height sensing device to permit greater positional sensing capabilities whenever required.

BRIEF DESCRIPTION OF THE DRAWINGS

Various advantages of the present invention will become apparent to one skilled in the art upon reading the following detailed description and by reference to the following drawings in which:

FIG. 1 is a schematic representation of an automotive vehicle having the leveling system according to the preferred embodiment of the present invention;

FIG. 2 is a side elevational view partially broken away of one of the air adjustable suspension leveling struts of the leveling system shown in FIG. 1, in one of the three height positions according to the preferred embodiment of the invention;

FIG. 3 is a side elevational view partially broken away of one of the air adjustable suspension leveling struts of the leveling system shown in FIG. 1 in the second of the three height sensing positions according to the preferred embodiment of the present invention;

FIG. 4 is a side elevational view partially broken away of one of the air adjustable suspension leveling struts of the leveling system shown in FIG. 1 in the third of the three height sensing positions according to the preferred embodiment of the present invention; and FIG. 5 is an enlarged pictorial view of the electromagnetic height sensing device incorporated in the air adjustable suspension leveling struts shown in FIGS. 2-4 according to a preferred embodiment of the present invention.

DESCRIPTION OF THE PREFERRED EMBODIMENTS

Referring now to FIG. 1, a vehicle leveling system 10 is shown in accordance with a preferred embodiment of the present invention. The vehicle leveling system 10 is shown in operative association with a typical automotive vehicle, which is generally designated by the numeral 12. The vehicle 12 includes a sprung portion or chassis 14 and unsprung or axle portion 16, between which the main or primary suspension springs 18 are located. Generally speaking, the leveling system 10 comprises a pair of auxiliary suspension components or leveling struts 20 and 20' which are adapted to be selectively pressurized and de-pressurized from a suitable source of fluid pressure such as an electrically energized air compressor 22. The compressor 22 is supplied with electrical energy from a conventional 12-volt vehicle battery 24 which is also connected to an electrical control module 26 via an electrical conductor 28. The module 26 is in turn connected to the compressor 22 via a suitable conductor 30, and a suitable fuse 32 may be provided in the electrical circuit connecting the battery 24 with the compressor 22. The compressor 22 is adapted to supply pressurized air to the suspension struts 20 and 20' via conduit 34, control valve mechanism 36, conduit 38, T-fitting 40 and conduits 42 and 44.

When the vehicle 12 becomes loaded to a predetermined magnitude, the control module 26 will energize the compressor 22 to increase the pressure in the conduits 34, 38, 42, and 44 and therefore in the leveling struts 20 and 20' connected thereto. The increase in pressure in the leveling struts 20 and 20' cause extension thereof so as to raise the sprung portion 14 of the vehicle 12 to a level or other predetermined attitude. At such time as the vehicle 12 is unloaded, the control module 26 will effect actuation of the control valve 36 such that the leveling struts 20 and 20' will be vented to atmosphere (or elsewhere), whereby the struts 20 and 20' will be compressed or contracted causing the sprung portion 14 of the vehicle 12 to be lowered to some predetermined attitude.

As shown in FIG. 2, the leveling strut 20 comprises a direct-acting hydraulic shock absorber 50 having a hydraulic cylinder or housing 52. Extending upwardly from the cylinder 52 is a reciprocable piston rod 54 which is connected at its lower end to a reciprocable piston (not shown) that is reciprocable within the cylinder 52 to dampen relative movement between the sprung and unsprung portions of the vehicle 12. The lower end of the cylinder 52 is provided with a lower end fitting 56 which is adapted to be secured in a conventional manner to the unsprung portion 16 of the vehicle 12, while the upper end of the piston rod 54 is provided with an upper end fitting (not shown) adapted to be secured in a conventional manner to the sprung portion 14 of the vehicle 12.

Mounted on and reciprocable with the piston rod 54 is an annular or tubular dirt or dust shield 60 which extends coaxially of the piston rod 54 and is spaced radially outward from the outer periphery of the cylinder 52. The upper end of the dirt shield 60 is provided with a generally inverted cup-shaped end cap 62 that is secured to the piston rod 54 and closes off the upper end of the dirt shield 60. Disposed between the lower end of the dirt shield 60 and the cylinder 52 is a rolling flexible diaphragm member, generally designated by the numeral 64. The diaphragm member 64 is fabricated of a suitable material, such as fabric reinforced rubber, and comprises an inner end portion 66 that is sleeved over the outer periphery of the cylinder 52.

The diaphragm member 64 also comprises an outer end portion 68 that is sleeved over the lower end of the dirt shield 60, with the inner and outer portions 66 and 68 being connected by a reversely folded lower portion 70, as illustrated in FIG. 2. The end portions 66 and 68 are secured to the cylinder 52 and dirt shield 60, by suitable clamping rings 72 and 74 respectively. Accordingly, the cylinder 52, dirt shield 60 and diaphragm 64 define a pressurizable chamber 76 which is adapted to be selectively pressurized by fluid, i.e., compressed air or the like, supplied from the compressor 22. A suitable attachment fitting 78 is provided on the dirt shield 60 for securing the adjacent end of the conduit 42 thereto, as will be apparent to those skilled in the art.

In accordance with the principles of the present invention, disposed internally of the chamber 76 and radially secured along the lower interior periphery of the dirt shield 60 is the prefabricated height sensing device 100. The height sensing device 100 has a generally tubular support member 80 which is suitable for supporting and locating the below described height sensing components 82 and 84. The tubular support member 80 is disposed concentrically between the cylinder 52 of shock absorber 50 and the dirt shield 60. Encircling the support member 80 is a pair of electrically conductive coil windings 82 and 84. When alternating current is delivered to the coil windings 82 and 84, an electromagnetic field is generated. In accordance with the present invention, the coil windings 82 and 84 encircling the support member 80 are spaced in a manner so as to define three discrete height positions of shock absorber 50 relative to the coil windings 82 and 84 as the shock cylinder 52 axially reciprocates through the support member 80. The three positions correspond to the location of a predefined portion of the shock absorber 50 either below, between or above the coil windings 82 and 84.

According to the preferred embodiment, the support member 80 is installed within the chamber 76 in close proximity to the clamping ring 72 which secures diaphragm 64 to the shock cylinder 52. The clamping ring 72 is fabricated from a material capable of producing a change in the electromagnetic field generated by the coil windings 82 and 84 as clamping ring 72 axially passes through the support member 80. The coil windings 82 and 84 are aligned on the support member 80 such that when the clamping ring 72 is positioned between the windings 82 and 84, the control valve 36 remains closed to the atmosphere and the compressor 22 remains de-energized. At such time as the vehicle becomes loaded to a predetermined magnitude causing the dirt shield 60 to move downwardly to the shock absorber 50, the clamping ring 72 will pass through the electromagnetic field generated by the upper coil winding 84 so as to produce a change in the electromagnetic field generated by the coil winding 84. Under these conditions, the control valve 36 is energized causing increased pressurization of the suspension components 20 and 20' to be effected so as to raise the sprung portion 14 of the vehicle 12.

When the load on the vehicle 12 is removed, the primary suspension springs 18 will cause the sprung portion 14 of the vehicle 12 to be raised, whereupon the clamping ring 72 will be displaced axially downward relative to the dirt shield 60. When this occurs, the control valve 36 will exhaust the conduit 38 to atmosphere so as to permit lowering of the sprung portion 14 of the vehicle 12. It will be noted that the longitudinal spacing between the coil windings 82 and 84 may be varied in accordance with the desired axial movement between the dirt shield 60 and the clamping ring 72, and that a suitable time delay feature as described in the aforementioned U.S. Pat. No. 4,017,099 may be incorporated in the electric circuitry of the leveling system to prevent premature energization of the compressor 22 and/or control valve 36 during such time as the vehicle transverses relatively irregular road surfaces.

With particular reference now to FIGS. 2, 3 and 4, the relative positioning of the clamping ring 72 mounted to shock absorber 50 to the spaced electrical coil windings 82 and 84 mounted on support member 80 is shown in the three height positions. FIG. 4 shows the relative positioning of the components when the vehicle 12 becomes loaded to a predetermined magnitude, such that the clamping ring 72 is axially positioned above upper coil winding 84. FIG. 3 shows the relative positioning of the components when the vehicle 12 is at the desired attitude associated with a predefined vehicular trim height. FIG. 2 represents the relative positioning of the components when the load on the vehicle 12 is removed, whereupon the clamping ring 72 will be positioned below the lower coil winding 82. FIGS. 2 and 4 represent the relative positions immediately following the loading or unloading placed on the sprung portion 14 of the vehicle 12 prior to actuation of the air compressor 22.

Referring now to FIG. 5, the height sensing device 100 according to the preferred embodiment of the present invention is shown in greater detail. The generally tubular support member 80 may be fabricated from any material suitable for rigidly supporting electrically conductive coil windings 82 and 84 which encircle its outer peripheral surface. The support member 80 is electrically nonconductive and permits identifiable changes in the electromagnetic field generated by each of the coil windings 82 and 84 when in close proximity thereto. This change in the electromagnetic fields generated by each of the coil windings 82 and 84 is sensed by the control module 26 so as to adjust vehicle height.

The support member 80 is fabricated from a rigid plastic material, though other suitable material may be used. The support member 80 may be secured to the inner peripheral wall of the dirt shield 60 by any suitable means so as to maintain its concentric alignment with the reciprocable shock absorber 50. According to the embodiment shown, the lower edge of dirt shield 60 defines an annular shoulder or flange channel 62 within which support member 80 can be easily installed. An electrical connector 92 communicates sensed changes in the electromagnetic field generated by the coil windings 82 and 84 to the control module 26 so as to effect energization of the compressor 22. The electrical connector 92 is airtightly mounted in an opening through a wall portion of dirt shield 60.

It will be seen from the foregoing that the present invention provides a leveling system incorporating a simplified height controlling device within the air adjustable leveling strut 20. This invention allows prefabrication of the height sensing device 100 for assembly into a typical air adjustable leveling strut. More importantly, the present invention provides an arrangement by which the height sensing device 100 may be conveniently supported within the associated leveling chamber (dirt shield 60) while eliminating orientation or prearrangement during assembly typical of current height controlling systems. By virtue of the fact that the aforesaid circuitry and height sensing coil windings 82 and 84 are prelocated relative to one another prior to installation, correct operating orientation of these elements is assured so that no subsequent adjustment of their relative position thereof is necessary. Further, if the clamping ring 72 is magnetized, it may be possible to have the coil windings 82 and 84 sense the relative position of the clamping ring 72 without being connected to a source of alternating current. Additionally, the present invention is adaptable to many applications without significantly increasing the assembly time of conventionally assembled leveling struts. Finally, applications of the principles of electromagnetics greatly simplify the operative components incorporated in leveling struts such that the novel height sensing device may be manufactured economically while providing long and effective operational life.

While the embodiment presented is directed at air adjustable leveling struts, the utilization of electromagnetics for sensing relative positional displacement is adaptable for application in any suspension component generating multiple positional signals. In particular, it is contemplated that the height sensing apparatus is readily adaptable to damping devices, such as shock absorbers or suspension struts, utilizing air or hydraulics as their primary damping medium.

While it will be apparent that the preferred embodiment of the invention disclosed are well calculated to fulfill the objects above stated, it will be appreciated that the invention is acceptable to modification, variation and change without departing from the proper scope of fair meaning of the invention.

What is claimed is:

1. A vehicle attitude control device operable to change the attitude of said vehicle in response to changes in first and second electromagnetic fields, said vehicle attitude control device comprising:
    a first member defining a chamber;
    a second member telescopically movable within said chamber;
    first means for sensing changes in said first electromagnetic field;
    second means for sensing changes in said second electromagnetic field;
    means for changing said first and second electromagnetic fields in response to relative displacement of said members;
    a source of pressurized fluid for supplying pressurized fluid to and from said chamber; and
    a control circuit for effecting actuation of said source of pressurized fluid in response to changes in said first and second electromagnetic fields.

2. The vehicle attitude control device according to claim 1, further comprising an air adjustable leveling strut.

3. The vehicle attitude control device according to claim 1, wherein said first and second means for sensing changes in said first and second electromagnetic fields comprise first and second electrically conductive coil windings.

4. The vehicle attitude control device according to claim 1, further comprising means for coaxially mounting said first and second means for sensing between said first and second members.

5. The vehicle attitude control device according to claim 4, wherein said mounting means comprises a substantially tubular mounting member adapted to conform to and be secured to the peripheral inner surface of said chamber through which said second member is telescopically movable.

6. The vehicle attitude control device according to claim 5, wherein said first and second means for sensing changes in said first and second electromagnetic fields comprise first and second electrically conductive coil windings longitudinally spaced at predetermined locations relative to said means for changing said first and second electromagnetic fields.

7. The vehicle attitude control device according to claim 6, wherein said means for changing said first and second electromagnetic fields is operatively associated with said second member telescopically passing through said tubular mounting member secured to said first member within said chamber.

8. The vehicle attitude control device according to claim 2, wherein said air adjustable leveling strut unit comprises a piston and cylinder assembly, a piston rod extended axially from one end of said cylinder, a generally tubular dirt shield mounted on said piston rod and extending coaxially thereof and spaced radially outward from said cylinder, and a rolling diaphragm member secured to said cylinder and said dirt shield in defining said chamber therewith.

9. The vehicle attitude control device according to claim 8, wherein said air adjustable leveling strut further comprises a generally tubular mounting member radially secured to the interior of said dirt shield, wherein said first and second means for sensing changes in said electromagnetic fields comprise first and second electrically conductive coil windings encircling said member and spaced thereon, and wherein said means for changing the electromagnetic fields associated with said first and second coil windings is operatively mounted to said cylinder telescopically passing through said tubular mounting member such that said means for changing said electromagnetic fields is axially movable relative to said first and second coil windings.

10. The vehicle attitude control device according to claim 9, wherein said means for changing the electromagnetic fields associated with said first and second coil windings comprises a clamping ring operably securing said diaphragm member to said cylinder, said clamping ring acting to induce changes in said electromagnetic fields of said coil windings corresponding to the axial location of said clamping ring relative to said coil windings thereby effecting actuation of said pressurized fluid source so as to change the attitude of said vehicle in response thereto.

11. An air adjustable leveling strut connecting the sprung and unsprung portions of a vehicle, said shock absorber operable to change the attitude of said vehicle in response to changes in said first and second electromagnetic fields, said air adjustable leveling strut comprising:
- a hydraulic direct acting shock absorber having a piston, cylinder and dirt shield;
- a piston rod coupled to said piston and extending axially from one end of said cylinder;
- a generally tubular diaphragm member defining a pressurizable chamber with said dirt shield and said cylinder;
- means for supplying pressurized fluid to and from said chamber;
- means for changing said first and second electromagnetic fields, said means operably associated with said cylinder;
- a generally tubular height sensing device concentrically disposed between said cylinder and said dirt shield within said chamber and secured therein, said height sensing member operatively supporting and positioning first and second electrically conductive coil windings radially encircling said support tubular member which are operable for sensing changes in said first and second electromagnetic fields in response to relative axial displacement between said cylinder and dirt shield; and
- a control circuit controlling energization of said pressurized fluid supply means;
- whereby said first and second electrically conductive coil windings define three discrete axial displacement positions of said shock absorber cylinder relative to said dirt shield such that the axial position of said means for changing said electromagnetic fields which is operably associated with said cylinder produces a control signal corresponding to its axial position below, between, and above said first and second windings so as to energize said pressurized fluid supply means to change the vehicular attitude accordingly.

12. The vehicle attitude control device according to claim 11, wherein said air adjustable leveling strut unit comprises a piston and cylinder assembly, a piston rod extending axially from one end of said cylinder, a generally tubular dirt shield mounted on said piston rod and extending coaxially thereof and spaced radially outward from said cylinder, and a rolling diaphragm member secured to said cylinder and said dirt shield and defining said chamber therewith.

13. The vehicle attitude control device according to claim 11, wherein said means for changing said first and second electromagnetic fields produced by said first and second electrically conductive coil windings comprises a circumferential clamping ring operably mounted to said shock cylinder so as to sealingly secure said rolling diaphragm member thereon.

14. The vehicle attitude control device according to claim 13, wherein the support member is radially secured to the interior of said dirt shield and wherein said first and second coil windings are longitudinally spaced such that said cylinder axially reciprocating through said supporting member acts to locate said clamping ring at relative axial positions below, between, and above said windings.

15. The vehicle attitude control device according to claim 14, wherein said cylinder mounted clamping ring acts to change the electromagnetic field associated with said coil windings corresponding to its relative axial positioning, thereby producing one of three discrete positional signals.

16. The vehicle attitude control device according to claim 11, wherein said pressurized fluid source comprises an electrically energizable air compressor actuated by said control circuit.

17. The vehicle attitude control device according to claim 16, wherein said control signal comprises time-averaging logic such that vehicular attitude is adjusted upon said means for changing said first and second electromagnetic fields maintaining an axial position relative to said first and second coil windings for a predetermined time period, thereby eliminating premature energization of said pressurized fluid source due to normal vehicle clamping motion of said shock absorber.

18. A height sensing device for an air adjustable leveling strut of the type having a hydraulic direct acting shock absorber, a dirt shield, and a pressurizable chamber adapted to be supplied with pressurized fluid, said device sensing changes in an electromagnetic field and comprising:
- a generally tubular support member concentrically disposed between said shock absorber and said dirt shield within said chamber;
- means for securing said support member to the inner peripheral surface of said dirt shield;
- at least one pair of electrically conductive coil windings radially encircling said tubular support member, said windings axially aligned on said member to define at least three discrete height sensing positions corresponding to three axial displacement positions of said shock absorber relative to said dirt shield; and
- an air tight electrical connector member mountable within an access opening passing through said dirt shield, said connector electrically connecting said windings to an external control circuit.

19. The height sensing device according to claim 18, wherein said tubular support member is electrically nonconductive and has transversely extending radial shoulders at its ends for protecting said coil windings.

20. The height sensing device according to claim 18, wherein the means for securing said tubular support member to the inner peripheral surface of said dirt shield comprises a transversely extending radial shoulder integral to said tubular support member at its lower end, said radial shoulder mountable within internal channel means provided at the lower end of said dirt shield.

21. The height sensing device according to claim 18, wherein said tubular support member supports one pair of electrically conductive coil windings, said coil windings sensing changes in the said electromagnetic fields.

22. The height sensing device according to claim 21, wherein the longitudinal spacing of said pair of coil windings defines three discrete axial height positions of said shock absorber relative to said dirt shield.

23. The height sensing device according to claim 22, wherein said height positions correspond to axial positioning of a shock absorber mounted clamping ring below, between, and above said pair of coil windings, said clamping ring inducing changes in the electromagnetic field associated with each of said coil windings.

24. A method of changing the attitude of a vehicle in response to changes in first and second electromagnetic fields, said vehicle having sprung and unsprung positions, said method comprising the steps of:
connecting an air adjustable leveling strut between sprung and unsprung portions of said vehicle, said air adjustable leveling strut comprising a hydraulic direct acting shock absorber having a piston, cylinder, dirt shield and a generally tubular diaphragm member defining a pressurizable chamber with said dirt shield and said cylinder;
providing first and second means for sensing changes in said first and second electromagnetic fields, said first and second means for sensing being concentrically positioned between said cylinder and said dirt shield within said pressurizable chamber;
changing said first and second electromagnetic fields in response to relative axial displacement of said air adjustable shock absorber between sprung and unsprung portions of said vehicle; and
actuating a source of fluid pressure to introduce or exhaust pressurized fluid to said air adjustable shock absorber so as to change the attitude of said vehicle.

25. The method as defined in claim 24, wherein said step of providing a first and second means for sensing changes in said electromagnetic fields further comprises first and second electrically conductive coil windings.

26. The method as defined in claim 25, wherein said coil windings are secured to a substantially tubular support member adapted to conform and be radially secured to a inner peripheral wall of said chamber through which said shock absorber cylinder is telescopically movable.

27. The method as defined in claim 26, wherein said step of changing said first and second electromagnetic fields associated with said first and second coil windings comprises a circumferential clamping ring operably mounted to said shock absorber cylinder so as to sealingly secure said rolling diaphragm member thereon and which is axially movable through said coil windings via axial movement of said shock absorber cylinder.

28. The method as defined in claim 27, wherein said support member is secured to the interior of said dirt shield and wherein said first and second coil windings are spaced such that said shock absorber cylinder axially reciprocating through said support member acts to position said clamping ring at relative displacement positions below, between, and above said coil windings.

29. The method as defined in claim 28, wherein said cylinder mounted clamping ring acts to change the electromagnetic field associated with said coil windings corresponding to the relative axial positioning of said clamping ring, thereby producing one of three discrete positional signals for selectively communicating with a control circuit effecting actuation of an external pressurized air source, thereby adjusting the length of said air adjustable leveling strut.

30. A vehicle leveling strut connectable to a source of pressurized fluid for changing the attitude of said vehicle, said leveling strut comprising:
a damper having a piston and rod assembly reciprocably confined within a first cylinder with a first end of said piston rod extending axially from one end of said first cylinder;
a second cylinder concentric with and radially outward from said first cylinder, said second cylinder secured to said first end of said piston rod for reciprocable movement therewith;
chamber means for providing a fluid-tight pressurizable chamber between said first and second cylinders;
displacement sensing means for sensing the relative axial displacement between said first and second cylinders, said displacement sensing means disposed between said first and second cylinder and capable of reciprocable movement with said second cylinder, said displacement sensing means including first and second coil means for generating first and second electromagnetic fields, respectively;
field changing means for changing one of said first and second electromagnetic fields in response to axial displacement of said first cylinder relative thereto, said field changing means operably associated with said first cylinder; and
a control circuit for sensing changes in one of said first and second electromagnetic fields and energizing said pressurized fluid source in response thereto, said first and second coil means defining three discrete axial displacement positions of said first cylinder relative to said second cylinder such that the axial position of said field changing means relative to said first and second electromagnetic fields generates an electrical control signal for energization of said pressurized fluid source to selectively charge the attitude of said vehicle.

31. A vehicle leveling strut according to claim 30 wherein said second cylinder comprises a generally tubular dirt shield, said chamber means comprising a rolling tubular diaphragm member secured between said first cylinder of said damper and said dirt shield, and wherein said field changing means comprises a metallic clamping ring securing said diaphragm member to said first cylinder.

32. A vehicle leveling strut according to claim 31 wherein said displacement sensing means comprises a generally tubular non-magnetic support member concentrically disposed between said damper and said dirt shield and secured to said dirt shield for axial reciprocable movement therewith, said support member having said first and second coil means supported thereon and radially encircling said support member at a predetermined longitudinal spacing such that axial reciprocable movement of said damper through said support member positions said clamping ring at relative axial positions below, between, and above said first and second coil means.

* * * * *

UNITED STATES PATENT AND TRADEMARK OFFICE
CERTIFICATE OF CORRECTION

PATENT NO. : 4,909,536

DATED : March 20, 1990

INVENTOR(S) : James A. Hale

It is certified that error appears in the above-identified patent and that said Letters Patent is hereby corrected as shown below:

Col. 7, Line 60, 61, "embodiment" should be --embodiments--;

Col. 7, Line 63, "acceptable" should be --susceptible--;

Col. 7, Line 65, "of" should be --or--;

Col. 11, Line 42, Claim 26, "a" should be --an--.

Signed and Sealed this

Nineteenth Day of November, 1991

*Attest:*

HARRY F. MANBECK, JR.

*Attesting Officer*    *Commissioner of Patents and Trademarks*